United States Patent [15] 3,706,218
Elmer [45] Dec. 19, 1972

[54] PATTERNED DIFFUSE REFLECTING

[72] Inventor: William B. Elmer, 113 Pinckney Street, Thornton, N.H. 02114

[22] Filed: May 25, 1970

[21] Appl. No.: 48,686

Related U.S. Application Data

[62] Division of Ser. No. 729,781, May 16, 1968, abandoned.

[52] U.S. Cl. .......................... 72/379, 72/414, 72/470
[51] Int. Cl. ............................................... B21j 13/02
[58] Field of Search........ 72/470, 414, 379, 385, 380, 72/475; 113/116 Z; 29/183.5, 163.5; 76/107 R; 18/DIG. 30, DIG. 31, 19 P, 35

[56] References Cited

UNITED STATES PATENTS

| | | | |
|---|---|---|---|
| 1,591,572 | 7/1926 | Stimson | 76/107 R |
| 314,543 | 3/1885 | Roesgen | 76/107 R |
| 1,387,616 | 8/1921 | Roberts | 18/35 |
| 1,822,451 | 9/1931 | Oestnaes | 76/107 R |
| 1,943,978 | 1/1934 | Luce | 72/379 |
| 1,950,005 | 3/1934 | Luce | 72/379 |

*Primary Examiner*—Richard J. Herbst
*Assistant Examiner*—Gene P. Crosby
*Attorney*—Charles Hicken

[57] ABSTRACT

A reflecting surface provides a controlled degree of diffusion by forming a number of generally congruent depressions of predetermined depth and shape. The surface prior to forming the depressions is typically essentially a specular reflecting surface. The depressions may be formed by placing the specular reflecting sheet between two opposed dies having intermeshing projections, each projection typically covering about one-third the area between adjacent projections and of generally pyramidal shape with rounded tops.

5 Claims, 7 Drawing Figures

PATENTED DEC 19 1972  3,706,218
FIG. 3
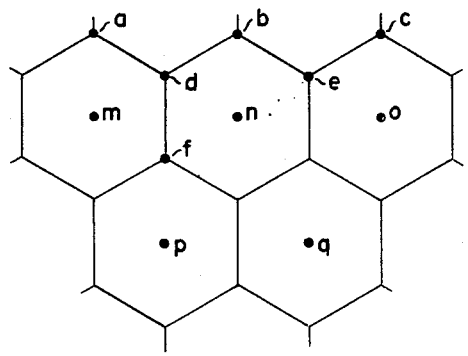
FIG. 4
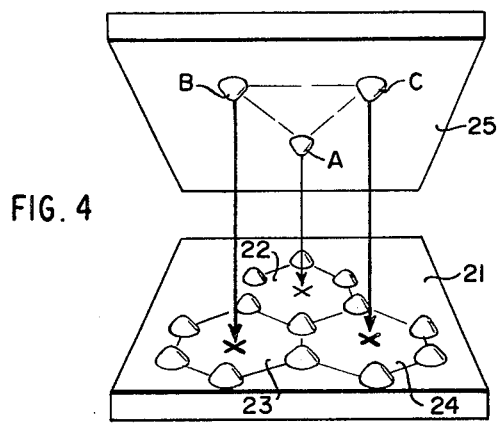
FIG. 7
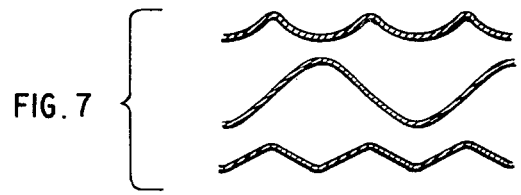
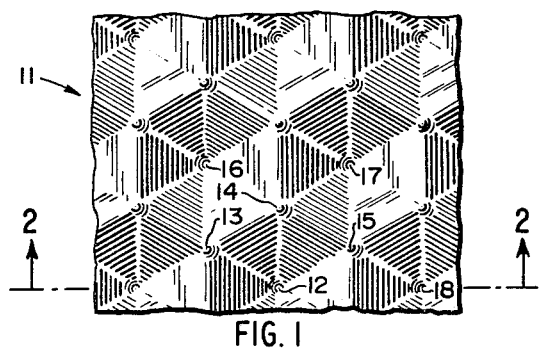
FIG. 1
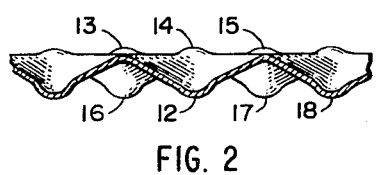
FIG. 2
FIG. 5
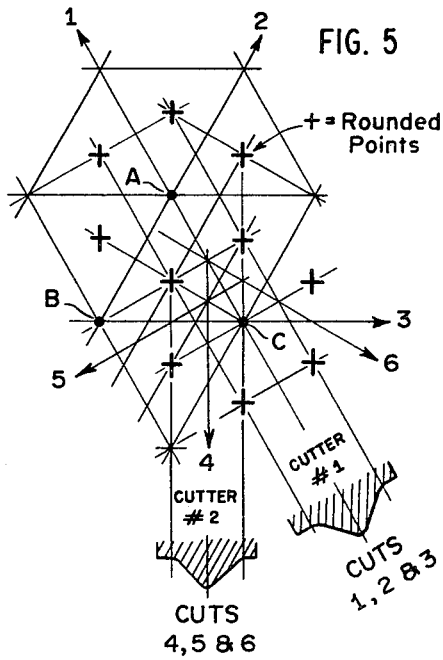
FIG. 6
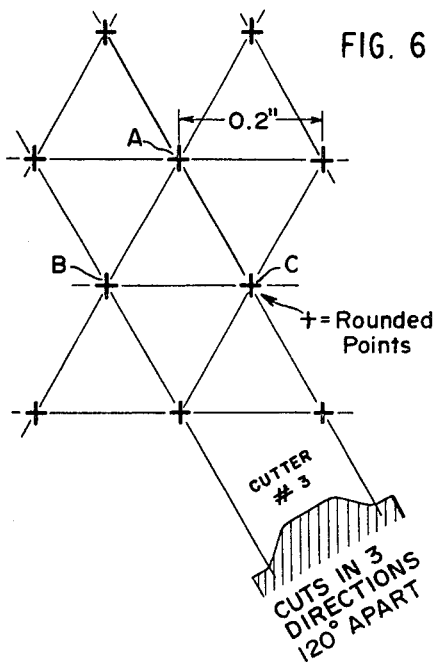
INVENTOR.
WILLIAM B. ELMER
BY
Wolf, Greenfield & Hicken
ATTORNEYS

PATTERNED DIFFUSE REFLECTING

This is a division of application Ser. No. 729,781, filed May 16, 1968, now abandoned.

BACKGROUND OF THE INVENTION

The present invention relates in general to diffuse reflecting and more particularly concerns novel methods and means for forming an array of depressions in a specular reflecting surface to achieve a desired degree of diffusion.

In designing lighting equipment it is often advantageous to use reflecting surfaces which reflect the incident light in a diffuse manner, preferably with control over the amount of degree of diffusion within specified limits. Specular, or mirror-like, reflectors display reflected images that are clear and sharply defined while matte reflectors break up and diffuse in all directions reflected light to such an extent that no image is visible in such reflectors. The reflectance, or efficiency, of the reflecting surface is independent of the specularity of diffusion of the surface. That is to say, the reflected portion or fraction of the total amount of incident light impinging upon the reflecting surface may be large, small or any intermediate value without regard to the direction in which the reflected rays are projected. In terms of geometrical optics the distinction between specular and diffuse reflectors resides in following and not following, respectively, the law that the angle of incidence is equal to the angle of reflection.

In matte diffusion incident light is usually widely and omnidirectionally scattered and originates in structure of molecular dimensions as distinguished from patterned diffusion usually originating in small finite irregularities, such as in dents, scratches and other irregularities in an otherwise polished specular reflecting surface. Light scattered by patterned diffusion is susceptible to control of angular spread through limited or specified solid angles of various shapes.

Reflectors may have any combination of specular, matte diffuse and pattern diffuse reflecting characteristics.

The present invention is primarily concerned with patterned diffuse reflecting. In many luminaires the light source is small and concentrated, but irregular in shape, such as the "coiled-coil" tungsten filament lamps. When a high degree of light control is desired, the reflected beam from the luminaire may show irregularities, streaks or striations resulting from the complicated geometric shape of the filament. In luminaires using other sources, such as quartz-iodine or metallic additive mercury lamps, objectionable color separation may be evident in the reflected beam of light. These disadvantages may be overcome by introducing a relatively small degree of patterned diffusion into an otherwise smooth polished specular reflecting surface to smooth the irregularities in the reflected beam, thereby achieving a satisfactory type of illumination.

Accordingly, it is an important object of this invention to provide a method and means for introducing a diffusion pattern into the surface of a smooth specular reflecting sheet which uniformly spreads the light through a relatively well-defined solid angle.

It is another object of this invention to provide a method and means for controlling the angle of diffusion by the depth of a stroke of a single patterning tool or die.

It is a further object of this invention to provide sheets of pattern reflecting material in accordance with the above objects of virtually any specified diffusing angle or spread and such spreads may be unequal in different directions on the plane of the sheet.

SUMMARY OF THE INVENTION

Means defining a generally specular reflecting surface is formed with a number of contiguous essentially congruent depressions of predetermined depth.

Apparatus for establishing these depressions typically comprises first and second die means which, when urged together, intermesh so that a projection on at least one of the dies embraces the center of each depression. More specifically, one of the die means typically defines a field of regularly shaped tapered cavities, such as hexagonal cavities, typically resembling a shallow honeycomb, in which each cell generally tapers toward the center. The other die means typically comprises a corresponding field of blunt and rounded tapered points so related to the first die means that each point is guided toward but does not necessarily reach the apex, or center, of each corresponding honeycomb cell when the two die means are brought together.

According to the method of the invention, a ductile reflector sheet of polished specular reflecting material, such as polished aluminum or the like, is placed between the first and second die means, and the die means are forced together to a predetermined limiting separation. The points push the metal into the honeycomb cellular field, stretching the metal into small rounded-off regularly shaped dents or hollows. The predetermined limiting distance determines the relative depth of the tapering indentations forced into the reflecting sheet, and hence governs the scope of angular diffusion or spread of reflected light from the sheet when the latter is employed in the construction of a reflector.

In an especially advantageous form of the invention, the first-mentioned die means may comprise a field of points, with each point lying at the corner of a regular polygon.

In certain luminaire applications it is desired to diffuse light unequally in different directions, or to produce a generally oval pattern of diffusion. This is accomplished by making die pairs in which the indentations and mating projections are correspondingly more elongated in that direction requiring the least diffuse spreading angle.

Numerous other features, objects and advantages of the invention will become apparent from the following specification when read in connection with the accompanying drawing in which:

BRIEF DESCRIPTION OF THE DRAWING

FIGS. 1 and 2 are plan and sectional elevation views, respectively, of a patterned diffuse reflecting surface according to the invention;

FIG. 3 is a diagrammatic representation of the field of rounded blunt points for a base die and a mating die block;

FIG. 4 is a view of the base die and mating die block having the point pattern of FIG. 3;

FIG. 5 shows a diagrammatic representation of locations of rounded points and milling cuts and the cross section of cutters for making one die by a preferred milling technique according to the invention;

FIG. 6 shows a diagrammatic representation of locations of rounded points and milling cuts and the cross section of a cutter for making the other die according to a preferred milling technique; and FIG. 7 illustrates various sections through a reflecting sheet according to the invention, depending on the specific shape of the die points and the depth of penetration.

DETAILED DESCRIPTION OF PREFERRED EMBODIMENTS

With reference now to the drawing, and more particularly FIGS. 1 and 2 thereof, there is shown plan and sectional elevation views, respectively, of a typical patterned diffusion reflecting sheet 11 according to the invention in which the contiguous congruent tapered depressions are of hexagonal shape in plan and triangular shape in elevation. Thus, each depression may have a center such as 12 and six regularly spaced points along the perimeter such as 13, 14 and 15. Each of the perimeter points will also be a perimeter point of an adjacent hexagonal depression. Thus point 13 is also on the perimeter of the hexagonal depression centered about point 16, point 14 is also centered about the latter depression and the hexagonal depression centered about point 17 and point 15 is on the perimeter about point 17 and point 18. While hexagonal shaped cavities are especially convenient, it is possible to use other congruent cavities, for example, triangular, square and the like.

Referring to FIG. 3, there is shown a diagrammatic representation of the layout of points on dies for making the patterned diffusion reflecting surface 11. A lower die may have a field of points, each point lying at the corner of a hexagon, such as at $a$, $b$, $c$, $d$, $e$ and $f$ as specifically indicated in FIG. 3 and at every other corner of the indicated hexagons. The points on a mating die may be located directly opposite the center of the indicated hexagons, such as at $m$, $n$, $o$, $p$ and $q$. The latter points comprise a field of points with each point separated from an adjacent point by the same distance, lines joining each point with three mutually adjacent points defining substantially equal angles having a common vertex at one of the points. The former points comprise a field of points each located at the corners of polygons centered opposite the field of points comprising $m$, $n$, $o$, $p$ and $q$.

FIG. 4 is a view of a mating pair of dies to illustrate how three hexagonal depressions may be formed. The base or lower die block 21 has projections at each corner of the three contiguous hexagons 22, 23 and 24 while the upper die 25 is formed with projections A, B and C directed toward the centers of hexagons 22, 23 and 24, respectively. When dies 21 and 25 are brought together, they form a field of small rounded blunt tapered depressions in a sheet placed therebetween, the depth of penetration of the die blocks into the plane of the sheet determining the depth of these depressions and, hence, the angular slope or steepness of the sides of the depressions. By controlling the travel of the die blocks 21 and 25 to a predetermined limit distance, the sheet may be impressed with a pattern which gives essentially any desired degree of departure from the plane condition and hence any desired degree of solid angular diffusion.

Tests on polished aluminum sheets of a wide range of thicknesses have demonstrated that a large range of angular spreads may be obtained from a single tool, simply by governing the travel of a movable die block with respect to the reflector sheet and baseblock.

Referring to FIG. 5, there is shown an enlarged view of a field of points in one die together with typical shapes of cutters which are capable of generating the desired field of points by straight line milling cuts across the respective blocks (or rolls). That is to say, a baseblock may be milled with cutter No. 1 of the indicated cross section along cuts 1, 2 and 3 and by a cutter No. 2 along cuts 4, 5 and 6 to produce the field of points in base die block 21. Similarly, referring to FIG. 6, a cutter No. 3 of the cross section shown may cut in three directions 120° apart to produce a field of rounded points on upper die 25. Thus, another feature of the invention is the ease with which the die blocks may be formed by straight line milling.

Referring to FIG. 7 there are shown a number of sectional views through a reflecting surface that may be formed through a reflecting sheet according to the invention by altering the limiting distance between the upper and lower die blocks or by altering the size and shape of the points.

The invention has a number of advantages. Prior art light-spreading diffusion patterns have been applied to a specular reflecting sheet in fixed modes. Thus, each desired degree of spread or diffusion has required an individual embossing tool. It has therefore been impractical to provide individual embossed patterns in reflecting sheet in a sufficient variety of depths or shapes to satisfy the range of spreads required for the numerous different luminaire designs typically encountered. With the apparatus and techniques according to the present invention, it is practical to pattern reflector sheets with spreads of, for example, 5, 10, 20 30 or virtually any other degree of spread which provides the desired beam amplitude or beam uniformity in a particular luminaire design.

Still another advantage resides in the shape according to the invention. Most diffusing patterns in the prior art have been produced by spherical-shaped dents, offset patterns or sharply cornered patterns. Patterns according to the present invention are of generally rounded tapering or pyramidal depressions with relatively long sloping areas terminating in rounded bases or apices that provide nearly perfect diffusion. With spherical dents, it is not possible to completely cover a spectral reflecting surface so that diffusion is not perfect. The undented flat portions which remain between the circles constitute an appreciable portion of the total reflector area with the result that the reflected beam is actually that of a diffused beam superimposed upon an undiffused beam.

If the spherical areas do completely meet and thus cover the reflector surface, as is common with another prior art pattern, the margins between dents are such that the spherical dents are not circular, but irregularly polygonal. The spheres thus terminate in points and concave edges. The outer areas of such spherical indentations die out in such a manner that the diffusion is nonuniform throughout the entire solid angle of spread with the spreading effect being weaker toward the margins of the spread angle than in the central region. With the pattern of the present invention the spreading effect is appreciably more uniform than with previous patterns.

It is evident that those skilled in the art may now make numerous uses and modifications of and departures from the apparatus and techniques herein disclosed without departing from the inventive concepts. For example, the die patterns described herein may be applied to mating pairs of rolls instead of mating pairs of flat blocks, and the spacing between centers of such rolls can be regulated to produce diffusing patterns of predetermined spreads in a manner analogous to that described for the flat blocks. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for producing a patterned diffuse reflecting surface in a ductile reflecting sheet comprising, first and second opposed die means having respective first and second opposed fields of points with said first field of points staggered from said second field of points for squeezing said ductile sheet therebetween when moved together a predetermined distance apart with a point of a set opposite a space between points of the other set.

2. Apparatus for producing a patterned diffuse reflecting surface in a ductile reflecting sheet in accordance with claim 1 wherein each point in said first field of points is separated from an adjacent point by the same distance, lines joining each point with three mutually adjacent points defining substantially equal angles having a common vertex at one of the points.

3. Apparatus in accordance with claim 2 wherein points in said second field are located at the corners of polygons centered opposite said first field points.

4. A method of introducing patterned diffusion into the surface of a ductile reflector sheet which method includes the steps of introducing said ductile reflector sheet between said first and second die means of claim 1, and moving said first and second die means together to a predetermined limit distance apart.

5. A method of introducing patterned diffusion into the surface of a ductile reflector sheet which method includes the steps of introducing said ductile reflector sheet between said first and second die means of claim 2, and moving said first and second die means together to a predetermined limit distance apart.

* * * * *